May 5, 1964 P. FECHKOWSKY 3,131,931
SHEET TRANSPORTING APPARATUS
Filed Sept. 12, 1961 7 Sheets-Sheet 1

INVENTOR.
PAUL FECHKOWSKY.
BY
Wallace P. Lamb
ATTORNEY.

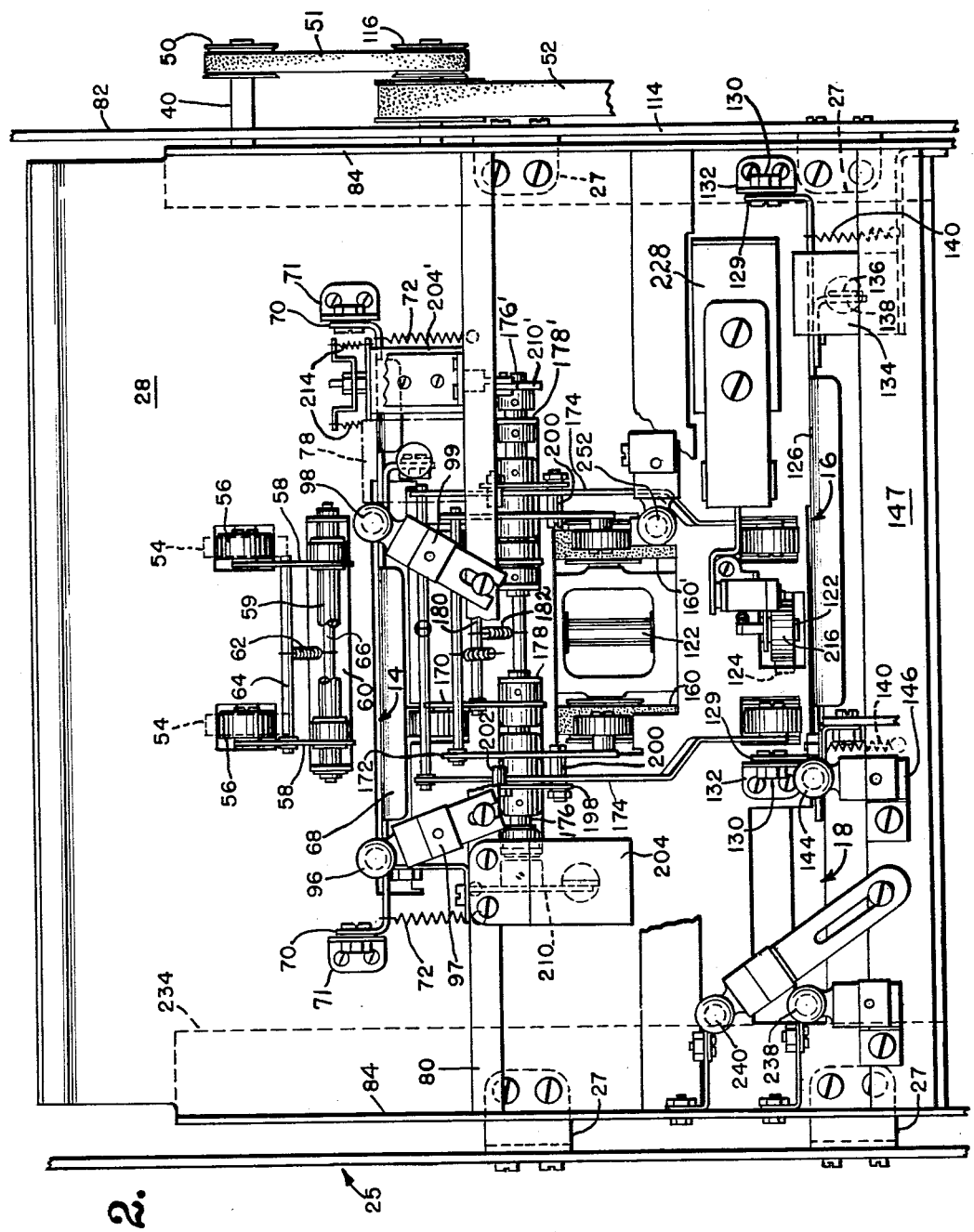

INVENTOR.
PAUL FECHKOWSKY.
BY
ATTORNEY.

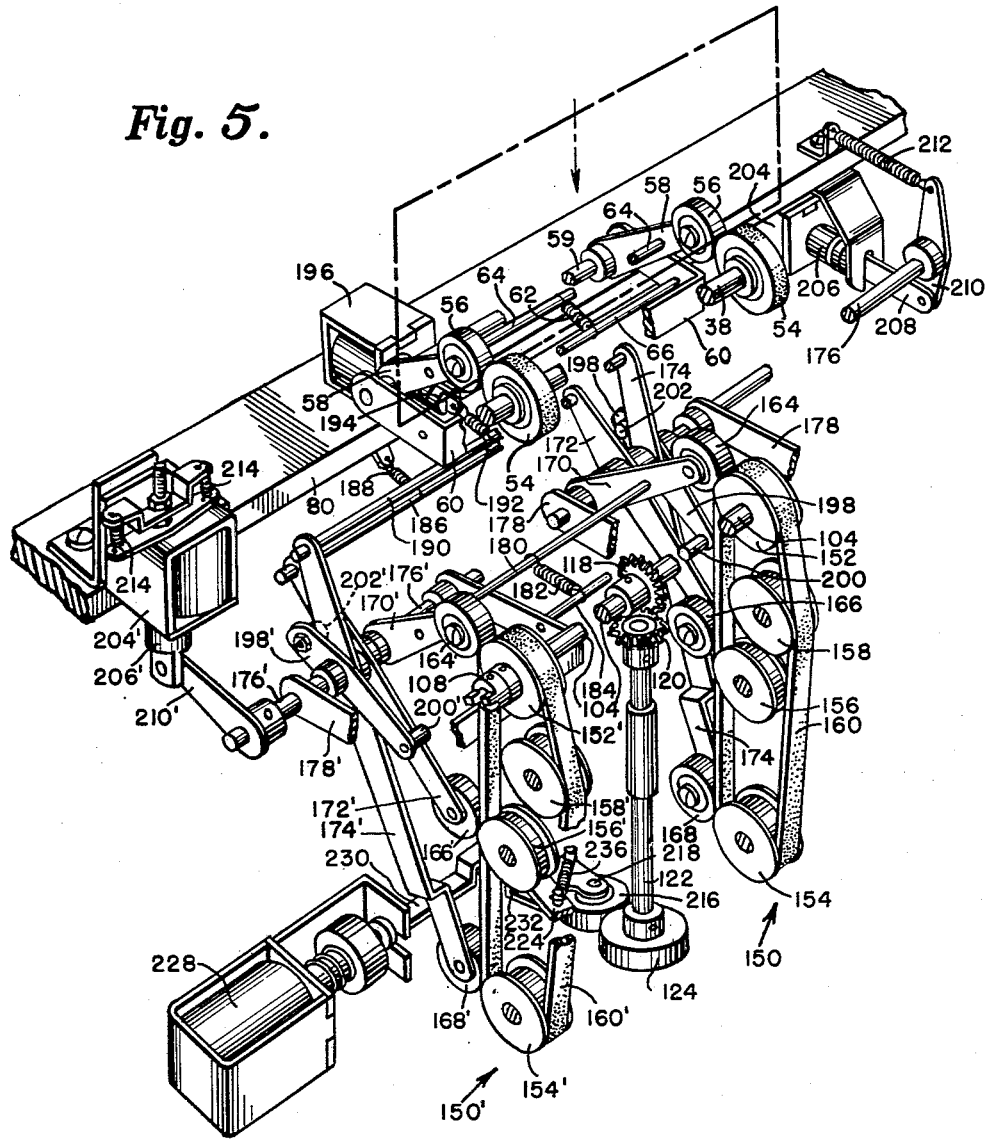

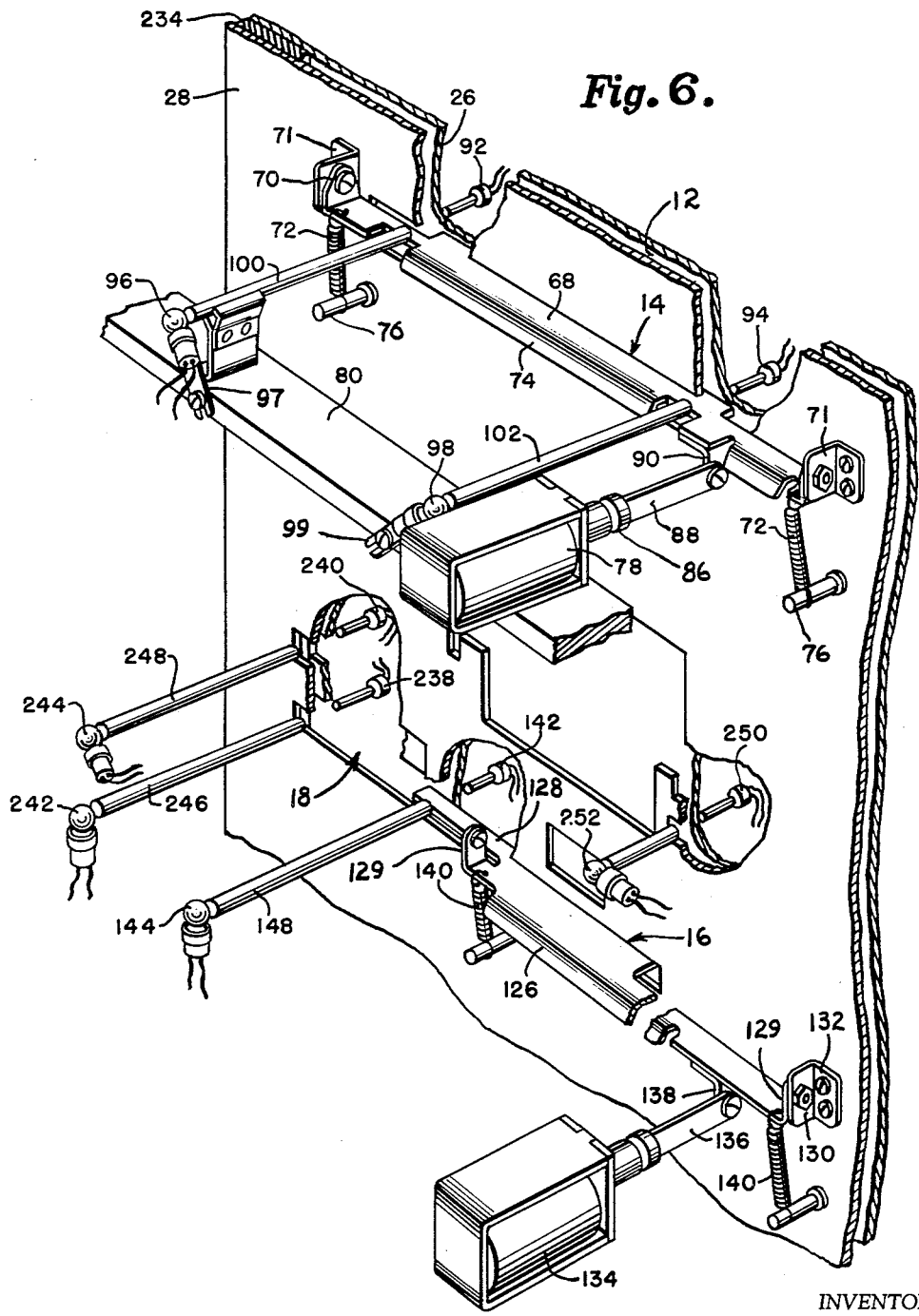

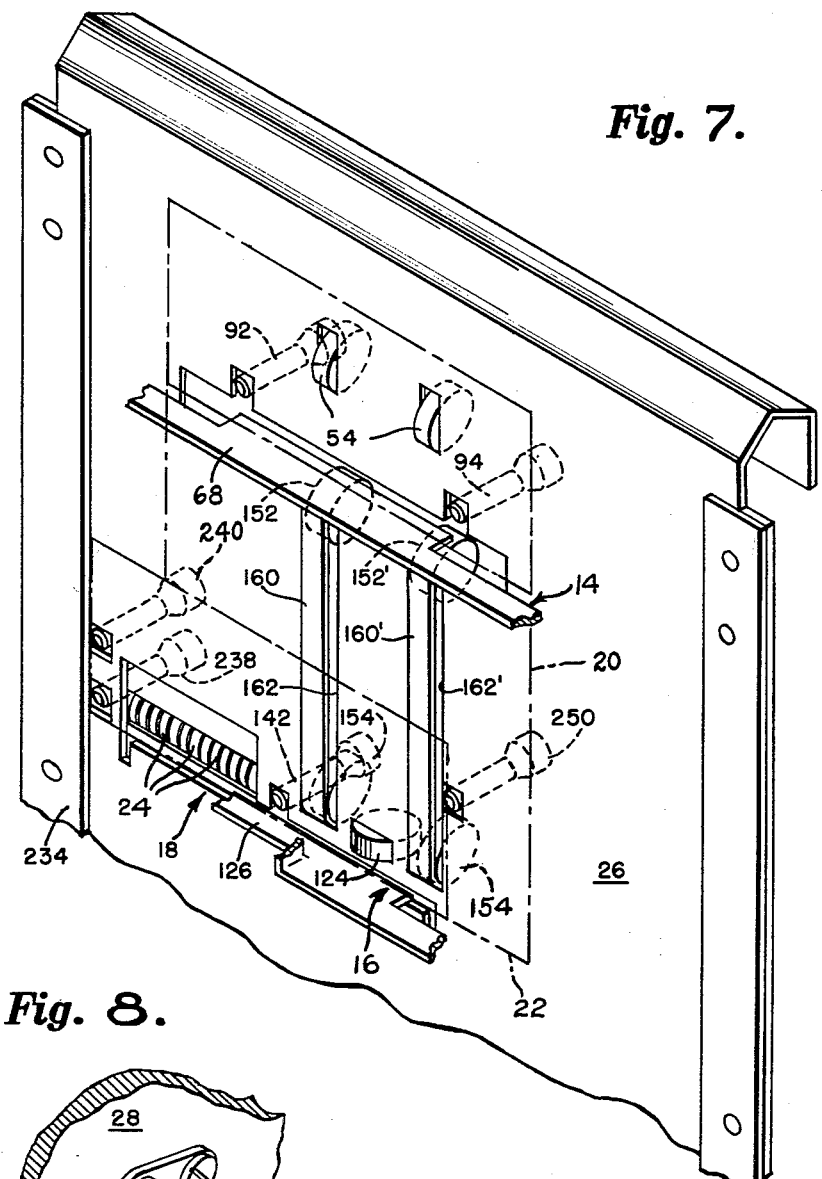
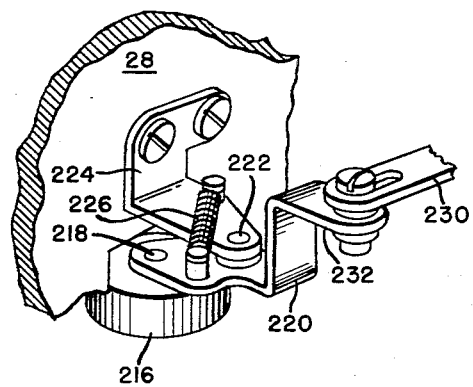

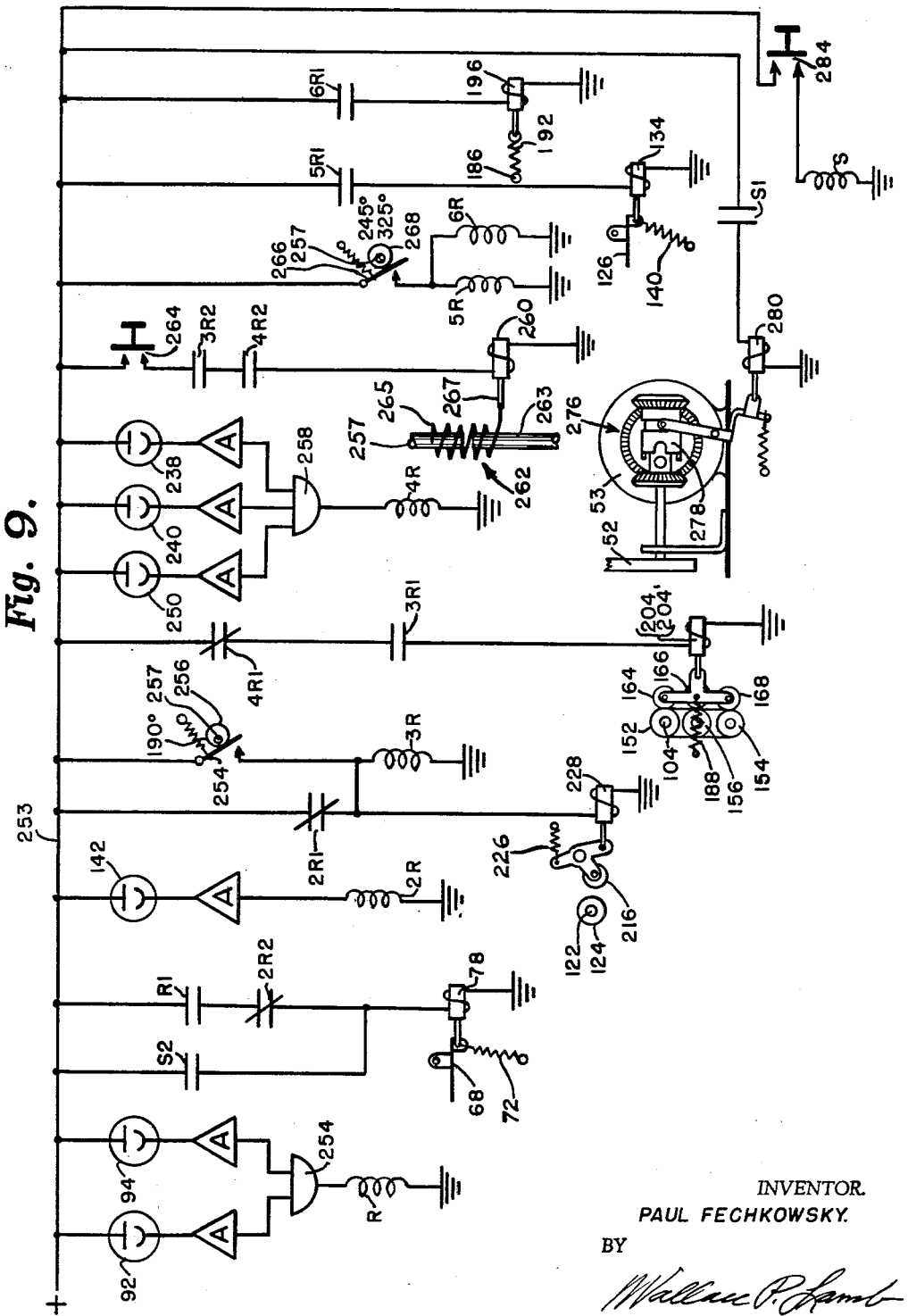

United States Patent Office 3,131,931
Patented May 5, 1964

3,131,931
SHEET TRANSPORTING APPARATUS
Paul Fechkowsky, Dearborn, Mich., assignor to Burroughs Corporation, Detroit, Mich., a corporation of Michigan
Filed Sept. 12, 1961, Ser. No. 137,600
13 Claims. (Cl. 271—48)

This invention relates generally to sheet transporting apparatus and particularly to an apparatus for transporting sheets from a sheet registering station to a sheet processing station.

One of the objects of the invention is to provide an improved card transporting apparatus for feeding a registered sheet from a sheet registering station to a longitudinally and laterally offset processing station while maintaining registry of the sheet.

Another object of the invention resides in the provision of sheet responsive controls to effect a change in direction of travel of the sheet without affecting the registry of the sheet.

Another object of the invention is to provide an improved sheet transporting apparatus in which a pair of sheet feeders acting to feed the sheet respectively in one direction and then in another direction to an information processing station also cooperate at a predetermined time to function as a holder to hold the sheet at the processing station during the processing operation.

Another object of the invention is to provide an improved sheet feeding apparatus for transporting a sheet from a sheet registering station to an information processing station by a feeder having a slip feed function of a character tending to straighten an askew sheet, and to provide for overcoming the slip feed function at a predetermined time so as to eject the sheet with added impetus from the processing station.

Other objects of the invention will become apparent from the following description, taken in connection with the accompanying drawings in which:

FIG. 2 is a rear view;

FIG. 5 is a fragmentary perspective view of sheet feeders and operating mechanism of the sheet transporting apparatus;

FIG. 6 is another fragmentary perspective view to show certain operating mechanism of the sheet transporting apparatus;

FIG. 7 is another fragmentary perspective view of part of the sheet feeding mechanism;

FIG. 8 is a detail perspective view;

FIG. 9 is a diagrammatic view of the apparatus and control system therefor.

Figure 1:
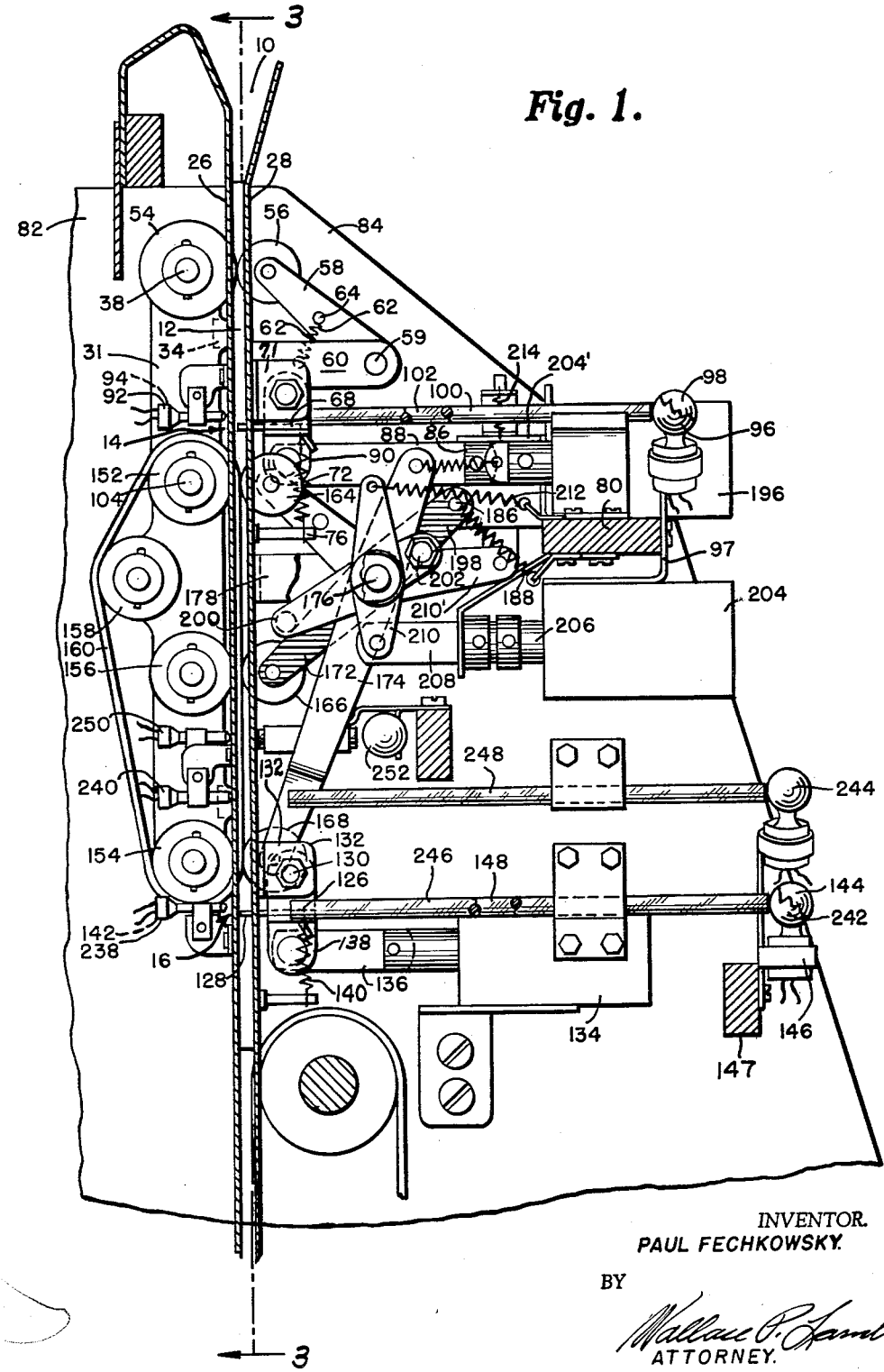
FIG. 1 is a vertical sectional view of a sheet transporting apparatus embodying features of the invention.
Figure 4:
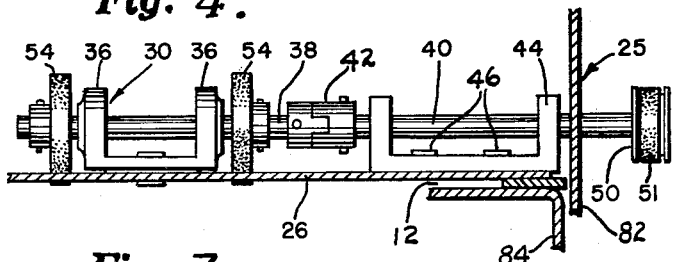
FIG. 4 is a fragmentary cross sectional view taken along the line 4—4 of FIG. 3.

Referring to the drawings by characters of reference, the check transporting apparatus comprises in general a hopper 10, a sheet guideway 12, a first or preliminary sheet registering station 14, a second sheet registering station 16, and a third sheet registering and information processing or printing station 18. Within the guideway 12 a sheet is transported along an L-shaped path of travel which has a vertical leg 20 leading downwardly from the hopper 10 and a horizontal leg 22 leading to the printing station 18. Spaced apart vertically along the vertical leg 20 of the path of sheet travel are the first and second stations 14 and 16 respectively, the second station being below the first and at the juncture of the legs 20, 22 of the L-shaped path of travel. At the printing station 18, the numeral 24 designates print elements of any suitable printing apparatus and it is the function of the transport apparatus to convey a precisely registered sheet from the first or upper registration station 14 and present the sheet in precise registration to the print elements 24. The sheets above referred to may be bank checks to be encoded at the print station 18. Any suitable printing apparatus may be employed such as the printing apparatus shown in the copending application of William A. Monticello et al., entitled Recording Apparatus, Serial No. 33,017, filed May 31, 1960, now Patent No. 3,018,721.

In construction, the check transporting apparatus includes a support or frame 25 and two main assemblies mounted thereon including a stationary front assembly having a vertical plate 26 and a removable rear assembly having a vertical plate 28. The plates 26 and 28 are normally in broadside spaced apart relationship defining the guideway 12 for the checks. In this construction, the rear assembly including the plate 28 is detachably secured by brackets 27 and suitable studs to the frame 25 for removal so as to give access to the interior of the apparatus for repair, replacement of parts, or to retrieve a check, if for any reason a check jam should occur and the check or checks cannot be otherwise retrieved.

Figure 3:
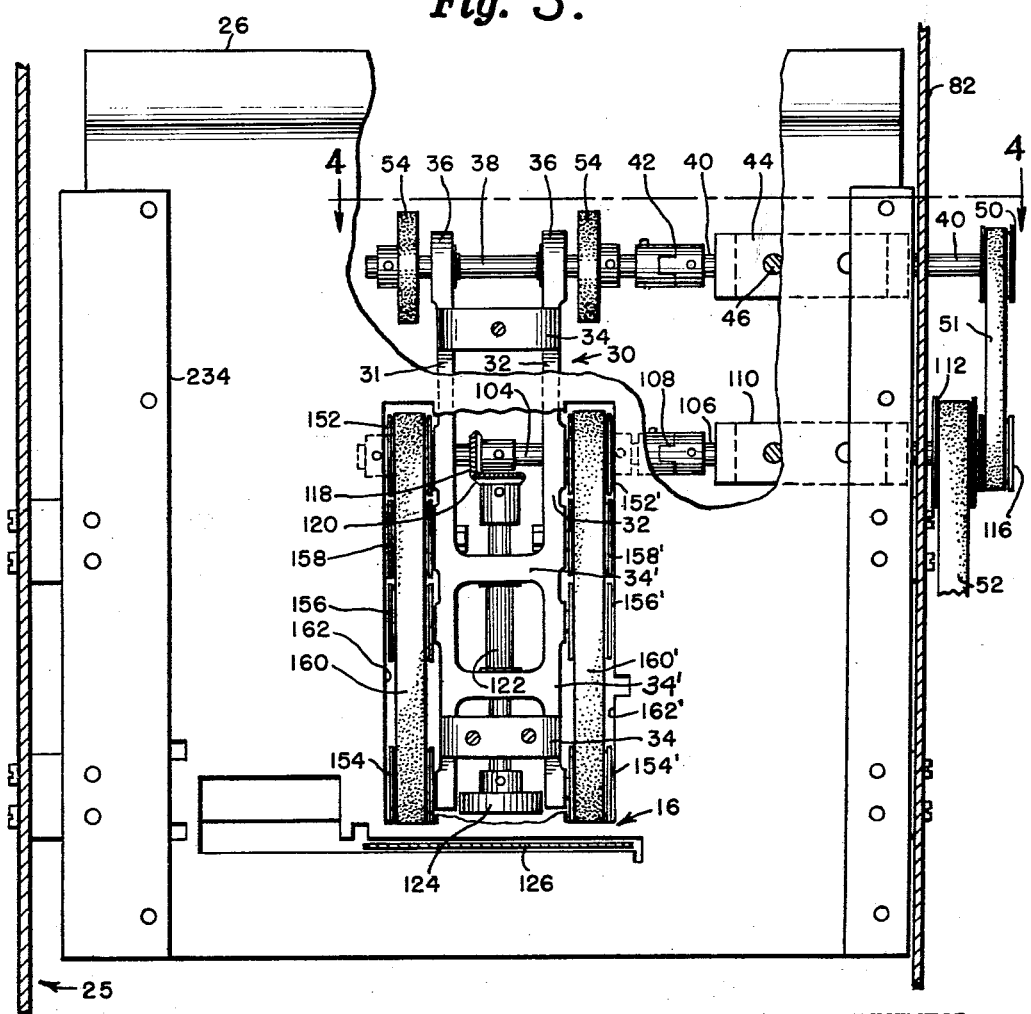
FIG. 3 is a vertical sectional view partly in elevation and taken along the line 3—3 of FIG. 1.

Rigidly secured to the plate 26 against the front face thereof is a mounting or journal member 30 which is a casting, in the present instance, having parallel vertical side members 31 and 32, and connecting cross members 34, as shown, for example, in FIG. 3. On the upper ends of the side members 31 and 32 there is a pair of horizontally spaced apart journals 36 for rotatably supporting a driven shaft 38 which is connected to a component shaft 40 by a coupling 42. The shaft 40 is rotatably supported on a journal member 44 which may be affixed to the front face of the plate 26 by bolts 46 or by other suitable fasteners. Projecting outwardly from the right side of frame 25 viewed in FIG. 2, the shaft 40 has a pulley 50 attached thereto, driven by means of belts 51 and 52 from a suitable source of power, such as an electric motor 53 which is shown only in FIG. 9.

Fixed onto the horizontal driven shaft 38, a pair of spaced apart check feed rollers 54 have their peripheries projecting into the vertical leg portion of guideway 12 to form bights therewithin respectively with a pair of correspondingly spaced apart pressure rollers 56. As shown, the pressure rollers 56 are carried on the ends of arms 8 which are freely mounted on a shaft 59, supported by a bracket 60 which may be suitably affixed to plate 28. A coil spring 62 yieldingly holds the pressure rollers 56 in engagement with the driven rollers 54, the spring having one end thereof attached to a rod 64 that connects arms 58 together and the other end anchored to a similar rod 66, mounted on the bracket 60.

Directly beneath the check feed rollers 54, 56, the first or preliminary check registering station is defined by a horizontal registering member or bar 68 down against which the leading or lower edge of a check is fed by the rollers. Preferably the bar 68 is in the form of a gate having end ears 70 pivotally mounted on brackets 71, affixed to the rear face of plate 28. A pair of horizontally spaced coil springs 72 hold the bar 68 in its normal or check intercepting position, projecting into check guideway 12, as shown in FIG. 1. Corresponding ends of the springs 72 are attached to the registering bar 68 and the other ends of the springs are anchored to studs 76, affixed to plate 28. A normally deenergized electrically operated actuator or solenoid 78 is provided to pivot the registering bar 68 to open position to allow a registered check to proceed downwardly therefrom and the solenoid is mounted on a cross member 80 which has its opposite ends fixed to opposite side plates 82 and 84, integral of plate 28. The solenoid 78 has the usual movable armature 86 which is connected by a link 88 to an arm 90 of the registering bar 68.

Controlling operation of the solenoid 78 there is a pair of switch members or photo electric cells 92 and 94 arranged in horizontal spaced apart relation along the registering bar 68. The photo electric cells 92 and 94 normally receive light respectively from a pair of lamps 96 and 98 through light conducting rods 100 and 102 respectively and maintain the circuit of the solenoid 78 normally open. Interception of the light is effected by and upon proper registering of the lower edge of a check on the registering bar 68 whereupon the solenoid 78 is energized to pivot the registering bar to allow the check to pass downwardly. As shown in FIG. 2, the lamps 96 and 98 are respectively supported by a pair of brackets 97 and 99 which are adjustably mounted on the cross member 80.

Directly below the driven shaft 38 and parallel therewith is a second driven shaft comprising shaft components 104 and 106 connected together by a suitable coupling 108, as best shown in FIG. 3. The shaft component 104 is journaled in the upright side members 31 and 32 of casting 30, and the shaft component 106 is journaled in a mounting member 110 which may be suitably secured to the plate 26. Projecting outwardly of the frame side member 82, the shaft component 106 has a pulley 112 affixed thereto which is driven by the belt 52, the shaft component also having a second pulley 116 fixed thereon from which driven shaft component 40 is driven by belt 51. Fixed onto the shaft component 104 between the upright side members 31 of casting 30 there is a bevel gear 118 in mesh with a similar gear 120, affixed to the upper end of a vertical shaft 122. The shaft 122 is suitably journaled in bearings (not shown), mounted respectively in vertically spaced webs 34' of the casting 30. Secured to the lower end of the shaft 122 is a feed roller 124 and slightly below this roller is the second registering station, this station being defined by a horizontal registering member or bar 126 which defines the horizontal leg 22 of the L-shaped path of check travel.

The registering bar 126 is pivoted or hinged on plate 28 and has a longitudinal marginal portion 128 that projects through the plate into the guideway, the bar 126 being normally in a plane transverse to the plane of plate 28 to intercept a downwardly fed check. At its opposite ends, the registering bar 126 has upturned ears 129 to receive pivot pins 130, mounted on brackets 132 which may be welded or be otherwise secured to the rear face of the plate 28. Operatively connected to pivot the registering bar 126 so as to allow a check to pass downwardly is an electrically operated actuator or solenoid 134 having its movable armature connected by a link 136 to a downwardly directed arm 138 of the registering bar 126. A pair of helical coil springs 140 normally hold the registering bar 126 in its normal check intercepting position shown and are overcome by and upon energization of the solenoid 134. A switch or photo electric cell 142 is provided to control the operation of the solenoid 134 and is arranged at the registering bar 126 to receive light from a lamp 144, mounted by a bracket 146 on a cross bar 147 connecting the side plates 82 and 84. A light conducting rod 148 conducts light from the lamp 144 onto the sensitive end of the photo electric cell to maintain the circuit of the solenoid 134 normally open, the circuit being closed when the light to the photo electric cell is blocked by the proper seating of the leading or lower edge of a check on the registering bar 126.

In order to transport a sheet or check from the first registering station 14 to the second registering station 16 while holding the check in its precisely registered position, I provide two similar check feed mechanisms, designated generally by the numerals 150 and 150' in FIG. 5. These feed mechanisms 150 and 150' are laterally positioned between the upper registering station 14 and the lower registering station 16 to receive a check from the feed rollers 54, 56 and transport the check downwardly to the lower check registering station 16 while holding the check against slippage. Since the feed mechanisms 150 and 150' are similar, a description of one of them is deemed sufficient, the corresponding parts of the other being designated by primed numerals.

With reference to the feed mechanism 150, there is mounted on the casting upright member 31 a group of four pulleys including an upper driving pulley 152, a lower driven pulley 154, an intermediate driven pulley 156 and an idler pulley 158. Around these pulleys there travels an endless check feeding belt 160, the leading side of which projects slightly through a clearance slot 162 provided in the guide plate 26. The belt driving pulley 152 is fixed onto the driven shaft component 104 and pulleys 154, 156 and 158 are suitably journaled on the upright of casting 31. When the machine is in use, the check feed belts 160 and 160' are operating continuously and travel in a direction to feed a check downwardly to the lower registration station 16, against the registering gate 126.

Cooperable with the lead side of the belt 160 there are three vertically spaced pressure rollers 164, 166 and 168 which normally engage the lead side of the belt, as shown, to provide three vertically spaced, aligned feed bights. The pressure rollers 164, 166 and 168 are carried respectively on the corresponding ends of individual levers 170, 172 and 174 which are freely mounted on a horizontal shaft 176 which is rotatably mounted in the legs of a U-shaped bracket 178, the web of which may be welded or be otherwise secured to the rear face of the guide plate 28. A tie rod 180 rigidly connects the levers 170 and 170' together and to the rod is attached one end of a biasing spring 182 which has its other end anchored to a rod 184 that extends between and is affixed to the side legs of the U-shaped bracket 178. The spring 182 yieldingly urges the rollers 164 and 164' into engagement with the check feed belts 160 and 160' respectively with sufficient frictional force to feed the check until the check abuts gate 126 whereupon slippage occurs with the opposite faces of the check to avoid crumpling the paper. Similarly, levers 172 and 172' are connected to pivot together by a tie rod 186 to which one end of a biasing spring 188 is connected, the other end of the spring being anchored to the cross member 80. Also, the levers 174 and 174' are connected together by a tie rod 190 to which one end of a biasing spring 192 is attached. The other end of the spring 192 is attached to the outer end of an armature 194 of a normally deenergized solenoid 196 which is mounted on the frame cross member 80. When the solenoid 196 is energized, the tension of spring 192 is increased which through the pivoting of levers 174 and 174' urges the rollers 168 and 168' with greater force against the feed belts 160 and 160' whereby to increase the frictional feeding force and give impetus to the feeding of a check downwardly or ejection of the check from the printing station after the lower registering bar 126 has been pivoted out of the guideway.

Fixed onto the shaft 176 there is an operating lever 198 for rotating the shaft in a direction to retract the rollers 164, 166, and 168 from belt 160, the purpose being to effect a release of a check at the gate 126 preparatory to the feeding of the check by roller 124 along the horizontal leg or registering bar 126 to the printing station. Carried by and adjacent respective ends of the operating lever 198 are laterally projecting abutment members or studs 200 and 202 which engage levers 172 and 174 to pivot the same and move the rollers 166 and 168 away from belt 160. A normally deenergized electrically operated actuator or solenoid 204 is provided to rotate the shaft 176 and thus through the pivoting of levers 198, 172 and 174, retract the pressure rollers 166 and 168. The solenoid 204 is mounted on the frame cross member 80 and includes a movable armature 206 which is connected by a link 208 to one end of a lever 210, fixed onto the shaft 176. A return spring 212 is connected to the other end of the lever 210 and anchored to the cross member 80. The solenoid 204' differs from solenoid 204 in that the armature 206' is connected directly to the lever 210' and is returned by a pair of return springs 214 directly connected to the armature.

Referring again to the horizontal check feed mechanism, it will be seen that the driven roller 124 thereof is positioned substantially midway between the feed belts 160, 160' at the lower or discharge ends thereof. Cooperable with the driven roller 124 there is a pressure roller 216 which is normally retracted to allow the feed belts 160, 160' to feed a check downwardly between the spaced apart peripheries of the driven roller 124 and the pressure roller 216. As is more clearly shown in FIG. 8, the pressure roller 216 is rotatably mounted, as at 218 on a lever 220 which is pivoted, as at 222, on a bracket 224, rigidly secured to the guideway plate 28. A coil spring 226 has one end thereof attached to one arm of lever 220 and the other end of the spring is anchored to the bracket 224, the spring acting to urge the pressure roller 216 into engagement with the driven roller 124. As shown in FIG. 5, an electrically operated actuator or solenoid 228 is provided to retract the pressure roller 216, the armature of the solenoid being connected by a link 230 to the free end 232 of the lever 220.

Movement of a check laterally along the horizontal leg of the L-shaped path of check travel is limited by the vertical edge of a stop or registering bar 234 at the printing station 18. At the station 18 there is an opening in plate 26 back of which print elements 24 are illustrated although it will be understood that any other sheet processing apparatus may be used at this station with the sheet transporting apparatus. Adjacent the vertical edge of the registering bar 234 there is a lower photo electric cell 238 and an upper photo electric cell 240 to sense respectively the lower and upper corners of the leading end edge of a check. Light is normally directed onto the photo electric cells 238 and 240 respectively by lamps 242 and 244 through light conducting rods 246 and 248. Preferably, another photo electric cell 250 is provided and is horizontally spaced from the vertical registering edge of bar 234 such that both of the feed belts 160, 162 are between the bar and the cell. Normally, the photo electric cell 250 receives light from an electric lamp 252 or until the light is intercepted by the presence of a check at the printing station. The horizontal distance between the registering bar 234 and the photo electric cell 250 determines the minimum length of check that will block light to the photo electric cell and still be engageable by both of the belts 160, 160'. This provision gives an indication to the machine attendant of the presence of an undersize check in the machine and the need for its removal. Removal of the check is effected by reversing the direction of the check feed driving belt 52 which is hereinafter described in detail.

Referring now to the diagrammatic view of FIG. 9, the photo electric cells 92 and 94 are connected in parallel to lead 253 which is representative of the position side of a source of direct current, and through amplifiers and an "and" gate 254 to a grounded relay R. In a circuit parallel thereto, the relay R has a pair of normally open contacts R₁ in series with the solenoid 78 to control operation of the upper check registering gate 68. The photo electric cell 142 is connected to the source of direct current and through an amplifier to a grounded coil 2R of a relay which has a pair of normally closed contacts 2R1 in series circuit with the solenoid 228 of the horizontal feed pressure roller 216 and a pair of normally closed contacts 2R2 in series with the normally open contacts R1 and solenoid 78. In parallel with contacts 2R1 and in series with solenoid 228 is a normally open timer operated switch 254 which is illustrated as being actuated by a cam 256 on a camshaft 257 that, for example, may be cyclically operated. In series with both the cam operated switch 254 and the normally closed contacts 2R1 is a normally energized ground coil 3R of a relay which includes a pair of normally closed contacts 3R1 in the circuit of the solenoids 204, 204' normally to hold the pressure rollers 164, 166 and 168 in engagement with belt 160 against the opposition of springs 188.

In parallel circuits, the photo electric cells 238, 240 and 250 connect to amplifiers and to an electric "and" gate 258 common thereto which gate connects to the coil 4R of a grounded relay having a pair of normally closed contacts 4R1 in series with contacts 3R1 and thus in series with the solenoids 204, 204'. In another of the circuits there is a grounded solenoid 260 connected to actuate a clutch 262 which controls the printing and also controls the cycling of the camshaft 257 which in turn controls the operation of the printer at station 18. In series circuit with the solenoid 260 is a manually operable switch 264, a pair of contacts 3R2 of relay 3R and a pair of contacts 4R2 of relay 4R. Since the contacts 3R2 and 4R2 will be closed only when a check at the printing station is blocking the light from all four of the cells 142, 238, 240 and 250, proper registration of the check is required in order to initiate a printing operation.

The clutch 262 for connecting the cam shaft 257 to a drive shaft 263 may be of any of the well-known one revolution clutches, such as the type illustrated in FIG. 9 in which a coil spring 265 surrounding the shafts is normally held disengaged by the armature 267 of the normally deenergized solenoid 260 and is tripped and reset each time that the solenoid is pulsed.

In another circuit is the solenoid 134 that opens the lower gate 126, the solenoid being controlled by a time operated switch 266, actuated by a cam 268 on the crankshaft 257. The cam 268 closes switch 266 after the closing of switch 254 and printing operation. A relay coil 5R in series with switch 266 has a pair of normally open contacts 5R1 in series with the gate solenoid 134. A second relay coil 6R in series with the switch 266 has a pair of normally open contacts 6R1 in series circuit with the solenoid 196 that operates through spring 192 to apply additional pressure to rollers 168, 168' so as to give impetus to the discharge of a check from the printing station.

As previously mentioned, the driven shafts 106 and 38 for the upper feed rollers 54, 56 and the lower feed belts 160, 160' may be driven by the electric motor 53 illustrated in FIG. 9, and in order to retrieve a check by reverse feed a gear transmission 276 is provided having a shifter 278. A solenoid 280 is operatively connected to move the shifter 278 to reverse feed position, and a manual or button switch 284 in series with the solenoid 280 is provided for operation by the machine attendant to energize solenoid 280. A switch 284 is closed to energize a relay coil S which has a pair of normally open contacts S1 in series with the shifter solenoid 280 and a second pair of normally open contacts S2 in series circuit with the upper gate solenoid 78. Thus, it will be seen that when the shifter solenoid 280 is energized to feed a check upwardly or back to the hopper 10 on the closing of contacts S1, the contacts S2 are also closed to effect the opening of the upper gate 68 to allow the check to pass upwardly to the hopper.

*Operation*

In operation, assuming that motor 53 is operating to drive the feed rollers 54, 56 and feed belts 160, 160' to feed in the normal or downward direction, the machine attendant places a check into the bight of the upper feed rollers 54, 56 which grip and feed the check downwardly until the leading edge of the check engages against the check registering gate 68. Thereafter, the rollers 54, 56 slip against the surfaces of the check to avoid rumpling the paper. If the check properly registers against the gate 68, the light from lamps 96, 98 to both of the photo electric cells 92, 94 will be blocked out and as a consequence relay R will be energized and close the contacts R1. The closing of relay contacts R1 effects energization of the solenoid 78 which then functions to open the gate 68 to allow the check to proceed downwardly. If the check does not align properly on the gate 68, the machine attendant may retrieve the checks by pressing the feed roller reverse switch 284. This will energize solenoid 280 to move the transmission shifter 278 to reverse feed position whereupon the feed rollers 54 and 56 will feed the check upwardly into the hopper 10 if the attendant keeps the switch 284 closed. Thus, the attendant may retrieve the check to again start the check into the bight of the feed rollers 54, 56.

Assuming that the check registers properly against the upper gate 68, the gate opens in response to said registration and the check, while still being held in its precise registered position, is fed into the bight between the upper feed ends of the belts 160, 160' and the upper pressure roller 164 so as to maintain the registered position of the check. The check is now fed downwardly by the belts 160, 160' and the cooperating pressure rollers 164, 166 and 168 between the normally spaced apart horizontal feed rollers 124, 216, against the lower gate 126. During this travel, if the check has remained in its registered position, established at and by the upper gate 68, the check on engaging the lower gate 126 will block out light to the photo electric cells 142 and 250. If the check has become slightly askew, the belts 160, 160' will straighten the check against gate 126. As a consequence of the blocking by the check of the light to the photo electric cell 142, the relay coil 2R will be energized and its contacts 2R1 will be opened which will deenergize the solenoid 228 and allow spring 226 to move the horizontal pressure roller 216 into effective feed relation with driven roller 124. In addition to deenergizing the solenoid 228, the parting of the contacts 2R1 also results in the deenergizing of the relay coil 3R whereupon contacts 3R1 close to energize the solenoids 204, 204'. The energized solenoids 204, 204' now act to retract the pressure rollers 164, 166 and 168 to release the check to the horizontal feed rollers 124 and 216. When this occurs, the rollers 124, 216 feed the check along the horizontal leg or gate 126 until the check abuts the vertical registering bar 234 whereupon the rollers slip. Thus, relay 2R in response to the presence of a check at the lower gate 126, blocking the light to cell 142, effects simultaneously the retracting of the vertical pressure rollers 164, 166 and 168 as a unit from the cooperating feed belts 160, 160', and the engagement of the horizontal feed rollers 124 and 216 whereby to change the direction of feed of the check while maintaining the preregistered position the check received at the upper registering gate 68 or adjusted registration at the lower gate 126. The contacts 3R2 are also closed when the relay coil 3R is deenergized by the opening of contacts R1, but this has no effect on the circuit of solenoid 260.

When the check moves to the printing station against the stop or registering bar 234 and blocks out the light to the cells 238 and 240 and continues to maintain the blocking of the light to cells 142 and 250, then the relay coil 4R is energized which opens its contacts 4R1 and closes its contacts 4R2. The opening of contacts 4R1 deenergizes the solenoids 204, 204' and as a consequence the springs 188 engage the vertical pressure rollers 164, 166 and 168 with the check feed belts 160, 160'. The pressure rollers 164, 166 and 168 now function as holders to hold the check down against the gate 126 during a printing operation which normally follows at the will of the machine attendant. At the same time, the horizontal feed rollers 124, 216 are holding the check against the stop 234. At this time, the relay contacts 3R2 and 4R2 are closed by the blocking of light by the check from all four of the cells 142, 238, 240 and 250 so that when the machine attendant closes the push button switch 264 the solenoid 260 will be energized to effect a cycle of operation of the camshaft 257. This initiates a printing operation on the check following which the cam 256 closes the switch 254 to again energize the solenoid 228 and also the relay coil 3R. As a result, the relay contacts 3R1 and 3R2 are opened. The opening of relay contacts 3R2 deenergized the solenoid 260, the one revolution clutch 262 continuing engaged for the remainder of its cycle. The opening of contacts 3R1 has no effect since relay contacts 4R1 are already open. Energization of the solenoid 228 on the closing of the switch 254 retracts the pressure roller 216, preparatory to the feeding of the check downwardly from the printing station when gate 126 is opened. The cam 256 holds the switch 254 closed until the end of the cycle of rotation before the occurrence of which the other cam or cam 268 closes the switch 266. The closing of switch 266 energizes both of the relay coils 5R and 6R which close their respective contacts 5R1 and 6R1. The closing of the contacts 5R1 energizes solenoid 134 which opens the gate 126 to allow the check to be fed downwardly by the feed belts 160, 160', and the closing of the contacts 6R1 energize the solenoid 196 which acts through the tensioning of spring 192 to increase the frictional feeding force of the belts to give impetus to the feeding of the check away from the printing station. When the check is fed away from the printing station all of the photo electric cells are, of course, exposed to the light from their respective lamps and as a consequence, all of the operating components and controls of the system return to their normal positions shown.

In general, when a check is placed in the hopper 10 and fed downwardly by the upper feed rollers 54 and 56, the check usually seats properly on the registering gate 68 in response to which relay 2R energizes solenoid 78 to open the gate and allow the check to proceed downwardly to the lower feed belts 160, 160' which then feed the check down to the lower gate 126. The check usually seats properly on the gate 126 and as a consequence, the pressure rollers 164, 166 and 168 are retracted to release the check from the feed belts 160, 160' and at the same time the horizontal feed rollers 124, 216 engage to feed the check along gate 126 until the check engages the vertical stop bar 234 at the printing station. Satisfying the conditions of registration imposed by the photo electric cells 142, 238, 240 and 250, the feed belts 160, 160' are re-engaged by their pressure rollers 164, 166 and 168 which now serve to hold the check down against the gate while the horizontal feed rollers 124, 216 hold the check against the vertical stop 234. The machine attendant now closes push button switch 264 which trips the one revolution clutch 262 to initiate a cycle of operation of camshaft 257. This initiates a printing operation on the check followed by the closing of switch 254 by cam 256 which retracts horizontal feed roller 216 to release the check. Following release of the check, cam 268 closes switch 266 which energizes solenoids 134 and 196 for respectively opening gate 126 and increasing the frictional feeding force of the feed belts 160, 160' momentarily. The opening of gate 126 allows the feed belts 160, 160' to feed the check down from the print station and at an increased speed due to the increased pressure of the rollers 164, 166 and 168 against the belts by solenoid 196. This quickly removes the check before the several operating components and control devices return to their normal positions when the departing check allows light to strike the photo electric cells.

If for any reason during the travel of the check along its L-shaped path of travel the conditions applied by the presence of the photo electric cells are not complied with, the machine attendant may retrieve the check by closing and holding the push button switch 284 is closed position. This energizes the relay coil S which closes its contacts S1 to move shifter 278 to reverse feed position. Also, relay contacts S2 are closed to open gate 68 for clearance by the reversely fed check which is moved upward into the throat 10 where access may be readily had to the check by the machine attendant.

While the sheet transporting apparatus has been shown and described in considerable detail, it will be understood that many variations and changes may be made therein without departing from the spirit and scope of the invention.

What is claimed is:

1. A sheet transporting apparatus for transporting a sheet from a sheet registering station along an L-shaped path to an information processing station while maintaining the registry of the sheet comprising a first sheet feeding member normally in a position to engage and feed a registered sheet along one leg of the L-shaped path and movable to a retracted position to release the sheet, a second and normally disengaged sheet feed member bodily movable to a position to engage a sheet and feed the sheet along the other leg of the L-shaped path of travel, sheet registering means at the juncture of said legs and a control member responsive to registration of a sheet against said registering means and operatively connected to effect bodily movement of said second feed member to said sheet engaging position.

2. A sheet transporting apparatus for transporting a sheet from a sheet registering station along an L-shaped path to an information processing station while maintaining the registry of the sheet comprising guide means forming one leg of the L-shaped path for communication with the registering station, a pair of cooperable sheet feed members normally operating to grip and feed a sheet along the said one leg of the path of travel, one of said cooperable feed members retractable to release the sheet, a guide member forming the other leg of said L-shaped path of travel to guide a sheet to the processing station and also to effect registration of a sheet, a pair of normally inactive feed members operable to feed a sheet along the said other leg to the processing station, one of said pair of normally inactive feed members normally retracted from an active feed position to receive a registered sheet from said pair of normally active feed members, and a control member responsive to registration of a sheet at said guide member and operatively connected to effect retraction of the said one of said normally operating feed members and release the said one of said normally retracted feed members.

3. A sheet transporting apparatus for transporting a sheet along an L-shaped path from a sheet registering station to an information processing station comprising first sheet feed means normally in position to grip and feed a registered sheet along one leg of the L-shaped path and movable to a sheet releasing position, second sheet feed means normally in a sheet releasing position and movable to a sheet feeding position to feed a sheet along the other leg of said L-shaped path, a stop member at the end of said other leg to stop the sheet in registration at the information processing station, a control member responsive to the presence of a sheet at the juncture of said legs and operatively connected to effect movement of said first feed means to sheet releasing position and at the same time effect movement of said second feed means to sheet feeding position, and a control member responsive to the presence of a sheet at said stop member and operatively connected to effect re-engagement of said first feed means with the sheet.

4. In a sheet transporting apparatus, means forming one leg of an L-shaped sheet guideway, a guide member forming the other leg of the sheet guideway and having a juncture with said means, a sheet stop member at the end of said guide member remote from said juncture, first feed means normally in a sheet feeding position and disposed along said one leg of the L-shaped guideway, said first feed means being bodily movable to an ineffective position, a second sheet feed means at the juncture and adjacent said first feed means, said second feed means normally ineffective and bodily movable to a sheet feeding position to feed a sheet along said guideway to said stop member, a control member responsive to the presence of a sheet at said guide member and operatively connected to effect bodily movement of said first feed means to the ineffective position thereof and said second feed means to the sheet feeding position thereof to feed a sheet along said guide member to said stop member, and a control member responsive to the presence of a sheet at said stop member and operatively connected to effect return of said first feed means to sheet feeding position.

5. In a sheet transporting apparatus for transporting a sheet from a sheet registration station to an information processing station, first feed means operable to grip and feed a registered sheet away from the registration station along one leg of an L-shaped path of travel, said feed means having a position ineffective to grip the sheet, a registering member forming the other leg of the L-shaped path of travel to guide the sheet to the sheet processing station, a stop member spaced from the first leg of the path of travel along the other leg and cooperable with the latter to define the sheet processing station, second sheet feed means at said sheet registering member and operable to feed the sheet to said stop member, said second feed means normally in a position ineffective to grip and feed a sheet and having an effective position, a control member responsive to the registration of a sheet at said registering member and operatively connected to render said first feed means ineffective and said second feed means effective, a second control member responsive to registration of a sheet against said stop member, and a third control member responsive to registration of the sheet with said registering member at the processing station, said second and third control members operatively connected mutually to render said first feed means effective to hold the sheet against said registering member.

6. An apparatus for transporting a paper sheet from a sheet registering station to an information processing station comprising a guideway, a continuous sheet feed belt arranged along said guideway and operable to feed a sheet along a path of travel, a retractable registering bar across the path of sheet travel to stop the sheet, retractable pressure rollers normally cooperating with said belt to feed a sheet down against said registering bar, the pressure of said pressure rollers normally insufficient to avoid slippage of the belt against the sheet when the latter is against said registering bar, sheet feed means at said registering bar including a feed roller and a normally retracted pressure roller to receive the sheet therebetween, means operatively connected to retract said pressure rollers and release said normally retracted pressure roller in response to registration of the sheet against said registering bar, said feed roller and normally retracted pressure roller operable to feed the sheet along said registering bar, a stop member positioned to stop said sheet against the feeding action of said feed roller and normally retracted pressure roller and defining the information processing station, means operatively connected to release said pressure rollers to engage and hold the sheet during the information processing operation and responsive to registration of the sheet at the processing station, a timed switch member operatively connected to retract both said retractable pressure rollers and said pressure roller, a second timed switch member operable subsequently to said first timed switch member manually operable means controlling operation of said timed switch members, means operable to retract said registering bar under control of said second timed switch member, and an actuator operable to urge said pressure roller further against said belt under control of said second timed switch member to eject the sheet from the processing station following retraction of said registering bar.

7. A sheet transporting apparatus for transporting a sheet from a sheet registering station along a path of travel to an information processing station while maintaining registry of the sheet comprising a retractable sheet feed member normally in effective position to feed a sheet along a portion of the path of travel to a predetermined point and retractable to an ineffective position to release the sheet, a registering bar across the path of travel at said point and extending therefrom to the registering station, a pair of feed rollers adjacent said registering bar and normally disengaged to receive the sheet from said feed member, and a control member responsive to registration of a sheet at said registering bar and operatively connected to effect retraction of said feed member and also effect cooperative engagement of said feed rollers.

8. A sheet transporting apparatus to transport a sheet to an information processing station comprising first sheet feed means operable to feed a sheet along a portion of a path of travel to a predetermined position and movable to a sheet releasing position, second sheet feed means normally in an ineffective position and movable to a sheet feeding position to feed a sheet along another portion of the path of travel, a stop member at the end of said other portion of the path of travel to stop the sheet in registration at the information processing station, a control member responsive to the presence of a sheet at the predetermined position and operatively connected to and for effecting movement of said first feed means to sheet releasing position and at the same time effecting movement of said second feed means to sheet feeding position, and a control member responsive to the presence of a sheet at said stop member and operatively connected to effect re-engagement of said first feed means with the sheet.

9. In a sheet transporting apparatus, a first sheet feed member normally in an effective position to feed a sheet along a path of travel and retractable to release the sheet, a second sheet feed member normally in an ineffective position to receive a sheet from said first sheet feed member and movable to an effective position, a sheet registering bar across the path of travel defining a sheet registering station and having an end portion extending laterally from the path of travel, a sheet stop member cooperable with said end portion defining a sheet processing station to which a sheet is fed by said second sheet feed member, a control member responsive to registration of a sheet against said registering bar and operatively connected to render said first feed member ineffective and said second feed member effective, said first feed member overlying both said registering station and said sheet processing station, and a control member responsive to registration of a sheet against said stop member and operable to release said first feed member for re-engagement with the sheet.

10. In a sheet transporting apparatus for transporting a sheet from a sheet registration station to an information processing station, first feed means normally effective to feed a registered sheet away from the registration station, sheet registering means positioned posteriorly to said feed means with respect to the direction of sheet travel and in part forming a sheet processing station, second sheet feed means positioned between said first sheet feed means and said registering means, said second sheet feed means normally ineffective and operable to feed a sheet along said registering means, a sheet stop member cooperable with said registering means to define the information processing station and to which a sheet is fed by said second sheet feed means, a first control member responsive to registration of a sheet at said sheet registering means to render said first sheet feed means ineffective and said second sheet feed means effective, a second control member responsive to registration of a sheet against said stop member, and a third control member responsive to registration of the sheet with said registering means at the sheet processing station, said second and third control members operatively connected mutually to render said first feed means effective to hold the sheet against said registering member.

11. An apparatus for transporting a paper sheet from a registering station an an information processing station comprising a rotatably driven sheet feed member, a first retractable pressure roller normally cooperating with said feed member to feed a sheet along a path of travel and retractable to release the sheet, a retractable sheet registering bar across the path of travel to stop the sheet, the pressure exerted by said pressure roller normally insufficient to prevent slippage of the driven sheet feed member against the sheet when the latter is against said registering bar, a driven sheet feed roller at said registering bar, a second and normally retracted pressure roller releasable to cooperate with said sheet feed roller to feed a sheet along said registering bar, a stop member laterally positioned along said registering bar from said driven sheet feed roller to stop a sheet at the information processing station, a control member responsive to registration of a sheet against said registering bar to effect retraction of said first retractable pressure roller and at the same time effect release of said normally retracted pressure roller, a second control member operatively connected to effect release of said first pressure roller for re-engagement of the latter to hold a check during the information processing operation and responsive to registration of the sheet at the information processing station, a timed switch member operatively connected to effect retraction of both said first and second pressure rollers to release the sheet at the information processing station, a second timed switch member, means operable to control operation of said timed switch members, means operable to retract said registering bar under control of said second timed switch member, and an actuator operable to urge said first pressure roller further against said driven sheet feed member under control of said second timed switch member to eject the sheet from the processing station following retraction of said registering bar.

12. An apparatus for transporting a paper sheet comprising a pair of plates defining a sheet pathway having a sheet inlet and a sheet outlet, a driven sheet feed belt projecting through one of the plates broadside into the sheet pathway and extending from a first sheet registering station to a second sheet registering station, a plurality of collectively retractable pressure rollers projecting through the other of said plates and normally in cooperative sheet feeding relationship with said belt, said plurality of pressure rollers spaced apart along said belt and including a sheet ejection roller adjacent said second sheet registering station and bodily movable relative to the other of said pressure rollers in a direction to increase the pressure on said belt to give added impetus to the ejection of a sheet from said outlet, a retractable sheet registering bar defining said second sheet registering station and extending across the sheet pathway anteriorly to said sheet ejection roller with respect to the direction of sheet feed by said belt, a sheet stop and registering member spaced laterally of said second sheet registering station and cooperable with said registering bar to define a third sheet registering station, normally ineffective feed means at said second sheet registering station and activatable to feed a sheet from said second sheet registering station to said third sheet registering station, a control member operatively connected to and for activating said sheet feed means and operable to retract said pressure rollers in response to registration of a sheet at said second sheet registering station, a control member operatively connected to and for effecting release of said pressure rollers to re-engage and hold a sheet at said third registering station in response to registration of the sheet at the third registering station, a first timed control member operable to render said feed means ineffective to hold the sheet at said third registering station, a second timed control member operable subsequently to the operation of said first timed control member, means operable to control operation to said first and second timed control members, means operatively connected to and for retracting said registering bar and controlled by said second timed control member, and an actuator operable to urge said sheet ejection roller further against said belt under control of said second timed control member to eject the sheet from said third sheet registering station following retraction of said registering bar.

13. In a sheet transporting apparatus, means defining a sheet guideway, a retractable registering bar cooperable with said means to define in part a sheet pathway having laterally positioned offset portions connected by said bar, said bar having junctures respectively with said portions to define a sheet registering station at one of them and a final sheet registering station at the other, normally ineffective sheet feed means at the first-mentioned sheet registering station operable to feed a sheet to the final registering station, a control member operatively connected to and for rendering said normally ineffective sheet feed means effective in response to registration of a sheet at the first-mentioned sheet registering station, normally effective sheet feed means operable to hold a sheet to said registering bar at the final registration station and also operable to eject a sheet from the final registering station following retraction of said retractable registering bar, and a timed control member operatively connected to said normally effective sheet feed means to effect ejection by the latter of a sheet from said final registration station.

References Cited in the file of this patent
UNITED STATES PATENTS

| | | |
|---|---|---|
| 2,266,587 | Carlson | Dec. 16, 1941 |
| 2,984,482 | Kist et al. | May 16, 1961 |
| 3,015,485 | Smith | Jan. 2, 1962 |
| 3,015,486 | Weidinhammer | Jan. 2, 1962 |
| 3,024,077 | Harwood et al. | Mar. 6, 1962 |